(12) United States Patent
Yoon et al.

(10) Patent No.: US 10,703,424 B2
(45) Date of Patent: Jul. 7, 2020

(54) FRONT ACTIVE SPOILER APPARATUS FOR VEHICLE

(71) Applicants: Hyundai Motor Company, Seoul (KR); Kia Motors Corporation, Seoul (KR)

(72) Inventors: Jin Young Yoon, Gimpo-si (KR); Hyun Kyung Kim, Hwaseong-si (KR); Seung Hyeok Chang, Suwon-si (KR); Ki Hong Lee, Seoul (KR); Dong Eun Cha, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/156,993

(22) Filed: Oct. 10, 2018

(65) Prior Publication Data

US 2019/0375469 A1    Dec. 12, 2019

(30) Foreign Application Priority Data

Jun. 11, 2018   (KR) .......................... 10-2018-0066742

(51) Int. Cl.
  *B62D 35/00*    (2006.01)
  *B62D 37/02*    (2006.01)
  *B62D 25/08*    (2006.01)

(52) U.S. Cl.
  CPC ........... *B62D 35/005* (2013.01); *B62D 37/02* (2013.01); *B62D 25/085* (2013.01)

(58) Field of Classification Search
  CPC .... B62D 35/007; B62D 37/02; B62D 35/001; B62D 35/005; B62D 35/02; B62D 35/00; B62D 35/008; B62D 25/16

USPC ................. 296/180.5, 180.1, 180.4, 76, 217; 701/49, 36
See application file for complete search history.

(56) References Cited

U.S. PATENT DOCUMENTS

| | | | | |
|---|---|---|---|---|
| 4,457,558 | A * | 7/1984 | Ishikawa | B60K 11/085 296/180.5 |
| 5,458,391 | A * | 10/1995 | Ito | B62D 35/005 296/180.1 |
| 9,102,366 | B1 * | 8/2015 | Kim | B62D 35/005 |
| 9,731,777 | B2 * | 8/2017 | Yoon | B62D 35/005 |
| 9,738,328 | B2 * | 8/2017 | Fahland | B62D 35/005 |
| 9,738,329 | B2 * | 8/2017 | Yoon | B60R 19/48 |
| 9,764,706 | B2 * | 9/2017 | Benvenuto | B60R 19/48 |
| 9,937,966 | B1 * | 4/2018 | Yoon | B62D 25/182 |
| 2017/0299006 | A1 * | 10/2017 | Shi | B62D 35/02 |

FOREIGN PATENT DOCUMENTS

KR    10-2004-0014780 A    2/2004

* cited by examiner

*Primary Examiner* — D Glenn Dayoan
*Assistant Examiner* — Sunsurraye Westbrook
(74) *Attorney, Agent, or Firm* — Morgan, Lewis & Bockius LLP

(57) ABSTRACT

A front active spoiler apparatus for a vehicle may include a spoiler housing fixed to a front end module and having a duct protruding forwards and configured to guide air flow; a spoiler lip configured to operate to open or close the duct; an actuator configured to connect the spoiler housing and the spoiler lip to operate the spoiler lip; and a controller configured to control the operation of the actuator using vehicle speed information.

14 Claims, 6 Drawing Sheets

FRONT ACTIVE SPOILER APPARATUS FOR VEHICLE

CROSS REFERENCE TO RELATED APPLICATION

The present application claims priority to Korean Patent Application No. 10-2018-0066742 filed on Jun. 11, 2018, the entire contents of which are incorporated herein for all purposes by this reference.

BACKGROUND OF THE INVENTION

Field of the Invention

The present invention relates to a front active spoiler apparatus configured for a vehicle and, more particularly, to a vehicle front active spoiler apparatus configured for reducing drag and lift by actively operating in conjunction with a vehicle speed.

Description of Related Art

A vehicle receives an air resistance force by colliding with the air in the atmosphere during traveling, and the air resistance force is largely divided into drag and lift.

The term "drag" refers to the resistance force applied to the vehicle body that directly faces with the air in the direction opposite to the travel while the vehicle is traveling, and the term "lift" refers to a phenomenon in which the vehicle body is lifted due to a pressure difference generated between the upper and lower portions of the vehicle.

Therefore, the vehicle requires an attachment for improving aerodynamic performance and enhancing fuel efficiency by reducing the drag and the lift, and a spoiler corresponds to such an attachment. The spoiler is also called an air spoiler as it usually changes air flow.

Meanwhile, a front spoiler (also called other names such as a nose spoiler, an air dam, and an air dam skirt) disposed on the front end portion of the vehicle reduces the drag by increasing the air amount flowing into the underbody in the lower portion of the vehicle while the vehicle is traveling at a medium-speed, and reduces the lift by reducing the air amount flowing into the underbody in the lower portion of the vehicle while the vehicle is traveling at a high speed. Through this, the front spoiler is configured for improving the aerodynamic performance of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front active spoiler apparatus configured for a vehicle, which is configured for reducing drag and lift by actively operating in conjunction with a vehicle speed, particularly a vehicle front active spoiler apparatus having a configuration in which a reduction gear and a link mechanism are used to increase an operating torque of the spoiler, reducing the size of a motor, so that weight reduction, cost reduction, and a compact configuration may be achieved.

Another aspect of the present invention is to further improve the drag reduction effect by arranging the inlet of a duct provided as an air passageway to be oriented toward the front of the vehicle and the outlet of the duct to be oriented toward the underbody side in the lower portion of the vehicle.

Another aspect of the present invention is to further improve the aerodynamic performance improvement effect of a vehicle by implementing a lift reduction effect as well during the operation of a drag reduction mode.

To achieve aspects described above, a front active spoiler apparatus configured for a vehicle may include: a spoiler housing fixed to a front end module and having a duct protruding forwards and configured to guide air flow; a spoiler lip configured to operate to open or close the duct; an actuator configured to connect the spoiler housing and the spoiler lip to operate the spoiler lip; and a controller configured to control the operation of the actuator using vehicle speed information.

The spoiler housing is fixed to the front end module to be located between a lower grill of a front bumper and a radiator assembly.

The duct extends in a front and rear direction inside the spoiler housing, and the duct has an inlet on a front side, which opens to a front surface of the spoiler housing and an outlet on a rear side, which opens to a rear lower side of the spoiler housing.

The outlet of the duct is provided to face an underbody in a lower portion of the vehicle, and air, which has passed through the outlet, passes through a lower side of the underbody.

The spoiler lip operates to open or close the inlet of the duct while being in close contact with and being spaced from the front surface of the spoiler housing, and the spoiler lip has a front surface in a round shape with an intermediate portion protruding more forward than upper and lower end portions.

The actuator may include a motor fixed to the spoiler housing, a speed reduction gear connected to the motor, a rotation shaft coupled to rotate with the speed reduction gear, and a link mechanism coupled to each of opposite end portions of the rotation shaft and connected to the spoiler lip.

The spoiler housing has an actuator mounting recess formed on a front surface thereof, the actuator is inserted into the actuator mounting recess, and the inlet of the duct is positioned above the actuator mounting recess.

The spoiler lip operates to close the inlet of the duct to reduce lift when the vehicle is in a high-speed travel state, and the spoiler lip operates to open the inlet of the duct to reduce both of drag and lift when the vehicle is in a medium-speed travel state.

The operation of the spoiler lip to open the inlet of the duct includes a primary operation mode and a secondary operation mode. The primary operation mode is an operation mode in which an upper end portion of the spoiler lip comes in contact with the front surface of the spoiler housing at a lower side of the inlet of the duct and a lower end portion of the spoil lip is spaced from the front surface of the spoiler housing to more protrude forwards than the upper end, and the secondary operation mode is an operation mode in which both the upper and lower end portions of the spoiler lip are spaced from the front surface of the spoiler housing.

Air passes through a space between the spoiler lip and the front surface of the spoiler housing when in the secondary mode of operation, and the air, which has passed through the space between the spoiler lip and the front of the spoiler housing, and air, which has passed through the duct, merge together to pass through a lower side of the underbody together.

The exemplary embodiment of the present invention provide a configuration in which the front spoiler apparatus is configured for reducing drag and lift while actively operating in conjunction with the vehicle speed, a configuration in which the speed reduction gear and the link mechanism are used to increase the operating torque of the spoiler. Through this, the size of the motor is reduced, so that weight reduction, cost reduction, and a compact configuration may be achieved.

Another aspect of the present invention is to further improve the drag reduction effect by arranging the inlet of a duct provided as an air passageway to be oriented toward the front of the vehicle and the outlet of the duct to be oriented toward the underbody side in the lower portion of the vehicle.

Furthermore, the present provides a configuration which is configured for implementing the lift reduction effect using the pressure of the air that hits the spoiler lip during the operation at the drag force reduction mode. Through this, it is possible to further improve the aerodynamic performance improvement effect of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
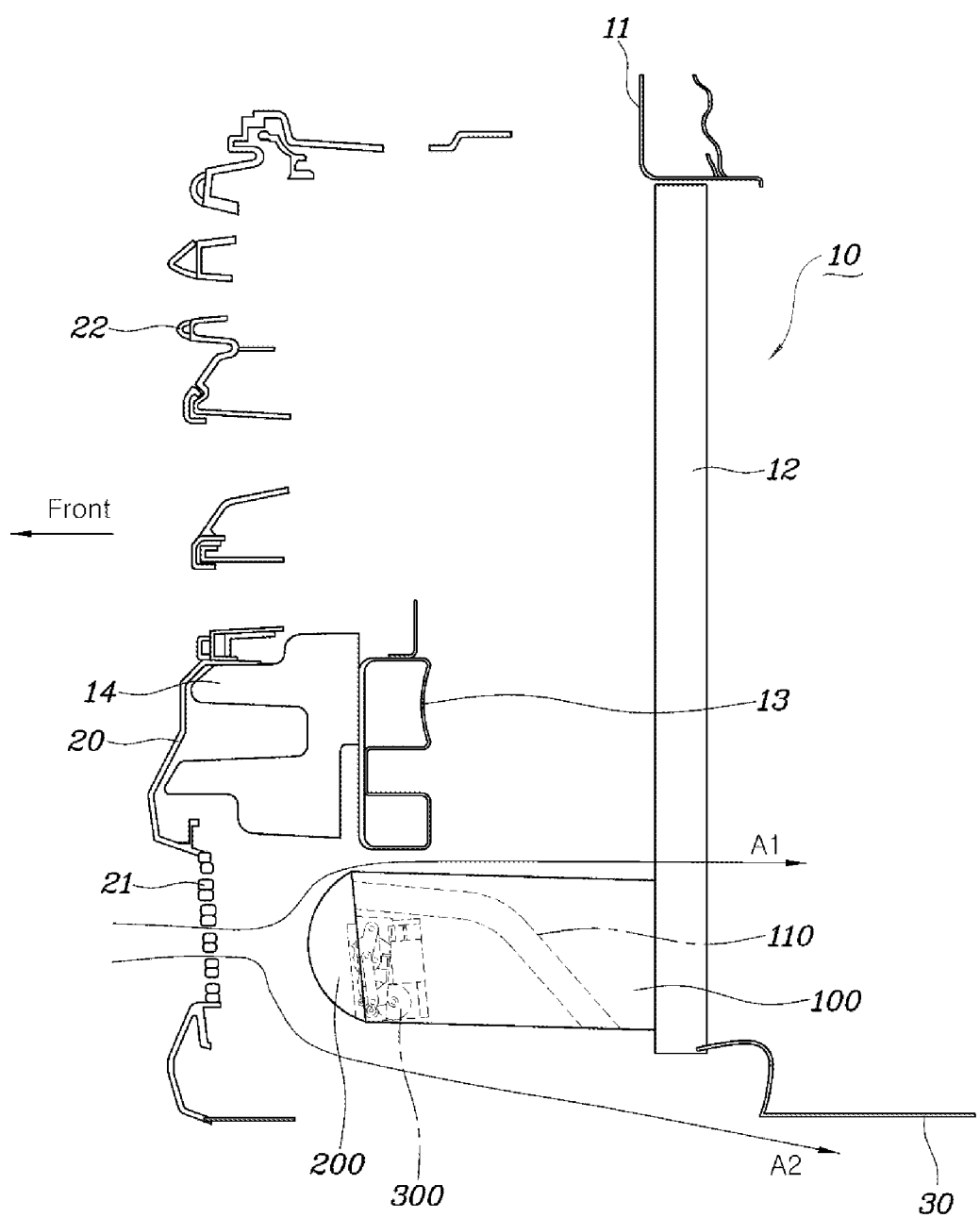
FIG. 1 is a view illustrating the state in which a vehicle front active spoiler apparatus according to an exemplary embodiment of the present invention is positioned in a front lower portion of the vehicle and a duct is closed.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a vehicle front active spoiler apparatus according to an exemplary embodiment of the present invention will be described with reference to the accompanying drawings.

As illustrated in FIGS. 1 to 6, a vehicle front active spoiler apparatus according to an exemplary embodiment of the present invention includes: a spoiler housing 100 fixed to a front end module 10 and having a duct 110 protruding forwards and configured to guide air flow; a spoiler lip 200 configured to operate to open or close the duct 110; an actuator 300 connecting the spoiler housing 100 and the spoiler lip 200 to operate the spoiler lip 200; and a controller 400 configured to control the operation of the actuator 300 using vehicle speed information.

The Front End Module (FEM) 10 refers to a module obtained by configuring a plurality of components on the front side of a vehicle as a single module. The FEM 10 includes a carrier or frame 11, which is a component forming a framework, a head lamp, a radiator assembly 12, and a front bumper beam 13.

Reference numeral 14 denotes an energy absorber.

The spoiler housing 100 according to an exemplary embodiment of the present invention has a structure in which the rear end portion thereof is fixed to the radiator assembly 12 and the front end portion thereof protrudes toward the front side of the vehicle. The spoiler housing 100 is disposed between a lower grill 21 of a front bumper 20 and the radiator assembly 12.

When the spoiler housing 100 is disposed at the rear end portion of the upper grill 22 of the front bumper 20, that is, when the active spoiler apparatus according to an exemplary embodiment of the present invention is disposed at the rear end portion of the upper grill 22, there is a disadvantage in that the possibility of breakage in an accident is increased even in a minor head-on collision or rear end portion collision. There is a disadvantage in that the appearance thereof becomes worse as the number of portions externally exposed through the upper grill 22 is increased. To prevent this, the spoiler housing 100 is disposed at the rear end portion of the lower grill 21 of the front bumper 20.

The duct 110 extends in the front and rear direction inside the spoiler housing 100 such that a front inlet 111 thereof opens to the front surface 101 of the spoiler housing 100 and a rear outlet 112 thereof opens to the rear lower side of the spoiler housing 100.

The rear outlet 112 of the duct 110 is formed to face the underbody 30 in the lower portion of the vehicle, and thus, the air passing through the rear outlet 112 is configured for passing through the lower side of the underbody 30, further improving the drag reduction effect of the vehicle.

The spoiler lip 200 operates to open or close the front inlet 111 of the duct 110 while coming into close contact with or separating from the front surface 101 of the spoiler housing 100.

The front surface of the spoiler lip 200 is formed in a round shape with the middle portion protruding more forward than the upper and lower end portions, minimizing the resistance to air flow to induce smooth flow.

The actuator 300 includes a motor 310 fixed to the spoiler housing 100, a reduction gear 320 connected to the motor 310, a rotation shaft 330 coupled to rotate together with the reduction gear 320, and link mechanisms 340 coupled to the opposite end portions of the rotation shaft 330 and connected to the spoiler lip 200.

Here, the reduction gear 320, the rotation shaft 330, and the link mechanism 340 except for the motor 310 may be regarded as a power transmission mechanism that transmits the power of the motor 310 to the spoiler ribs 200. However, in the exemplary embodiment of the present invention, it is assumed that all thereof are included in the range of the actuator 300.

The motor 310 is preferably a DC motor which is rotatable bidirectionally and is relatively inexpensive. There are provided preferably two or more reduction gears 320 to exhibit a torque as large as a large reduction ratio to be implemented. The link mechanism 340 is configured as a four-joint link for more stable operation.

According to an exemplary embodiment of the present invention, an actuator mounting recess 120, into which the actuator 300 is inserted, is formed in the front surface 101 of the spoiler housing 100, and the front inlet 111 of the duct 110 is positioned above the actuator mounting recess 120.

That is, various aspects of the present invention provide a structure in which the actuator 300 is inserted into the actuator mounting recess 120 formed in the front surface 101 of the spoiler housing 100. Through this, there are advantages in that it is not necessary to secure a separate space for the actuator 300 outside the spoiler housing 100 and in that it is possible to reduce the overall external size and volume, making it possible to achieve a compact apparatus.

Furthermore, the actuator 300 disposed in the actuator mounting recess 120 is configured to be shielded by the spoiler lip 200. Through this, it is possible to achieve an improvement in the beautiful appearance of the actuator 300 by preventing exposure to the outside.

Furthermore, various aspects of the present invention provide a configuration in which the power of the motor 310 may be output with a large torque through the reduction gear 320 and the link mechanism 340. Since this make it possible to use the motor 310 having a small capacity, there is an advantage in that size reduction, weight reduction, cost reduction, and a compact configuration may be achieved.

Figure 2:
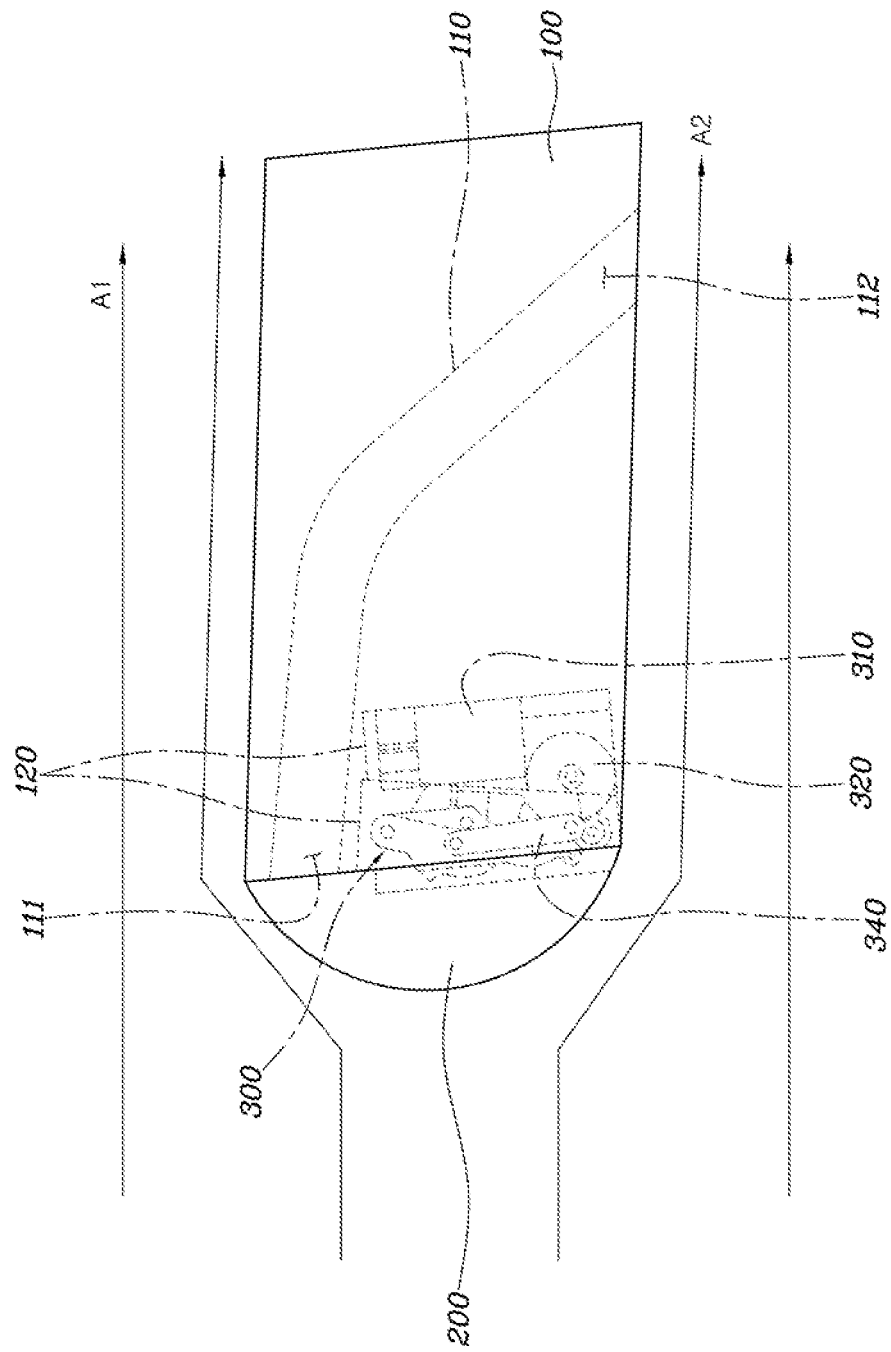
FIG. 2 is an enlarged view of the vehicle front active spoiler apparatus of FIG. 1.
Figure 3:
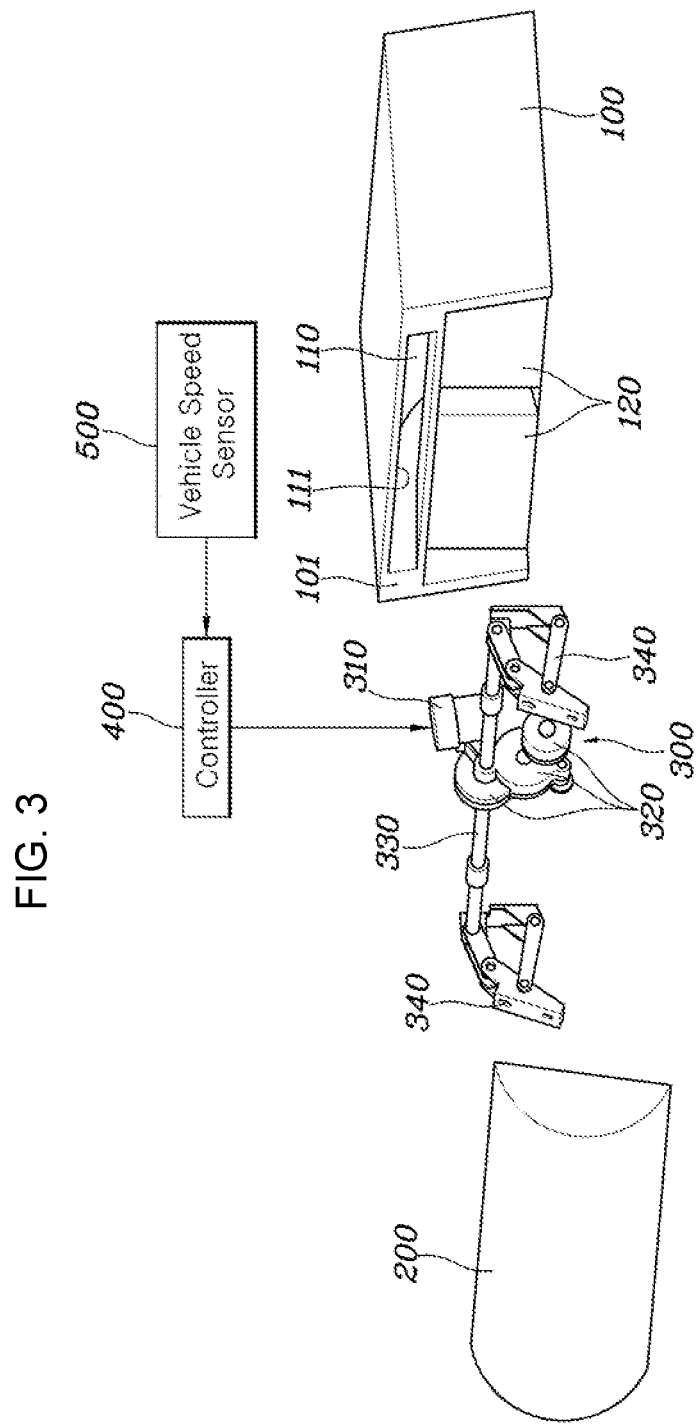
FIG. 3 is an exploded perspective view of the vehicle front active spoiler apparatus according to an exemplary embodiment of the present invention.
Figure 4:
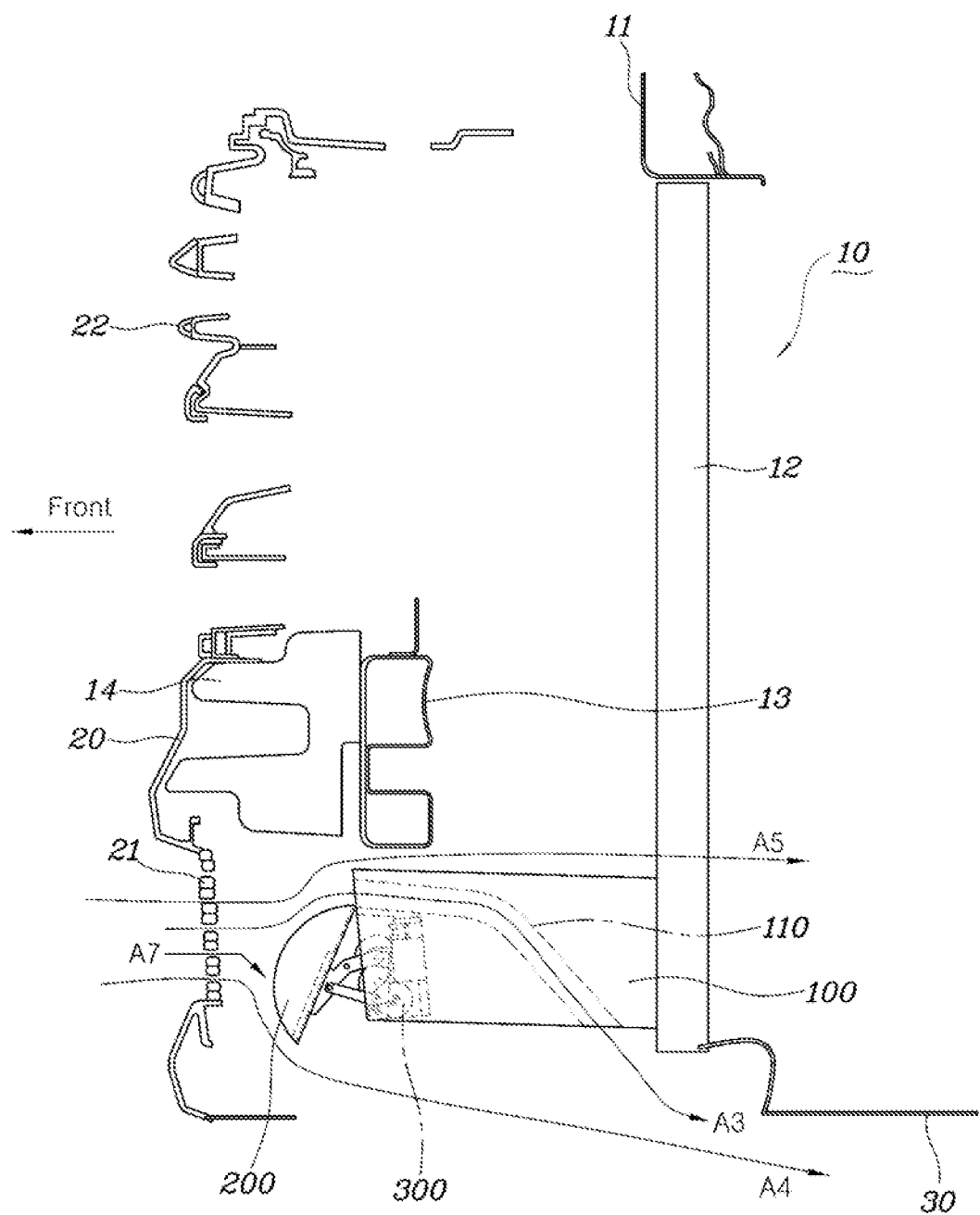
FIG. 4 is a view illustrating the state in which a duct is opened by the operation of a spoiler lip in FIG. 1.
Figure 5:
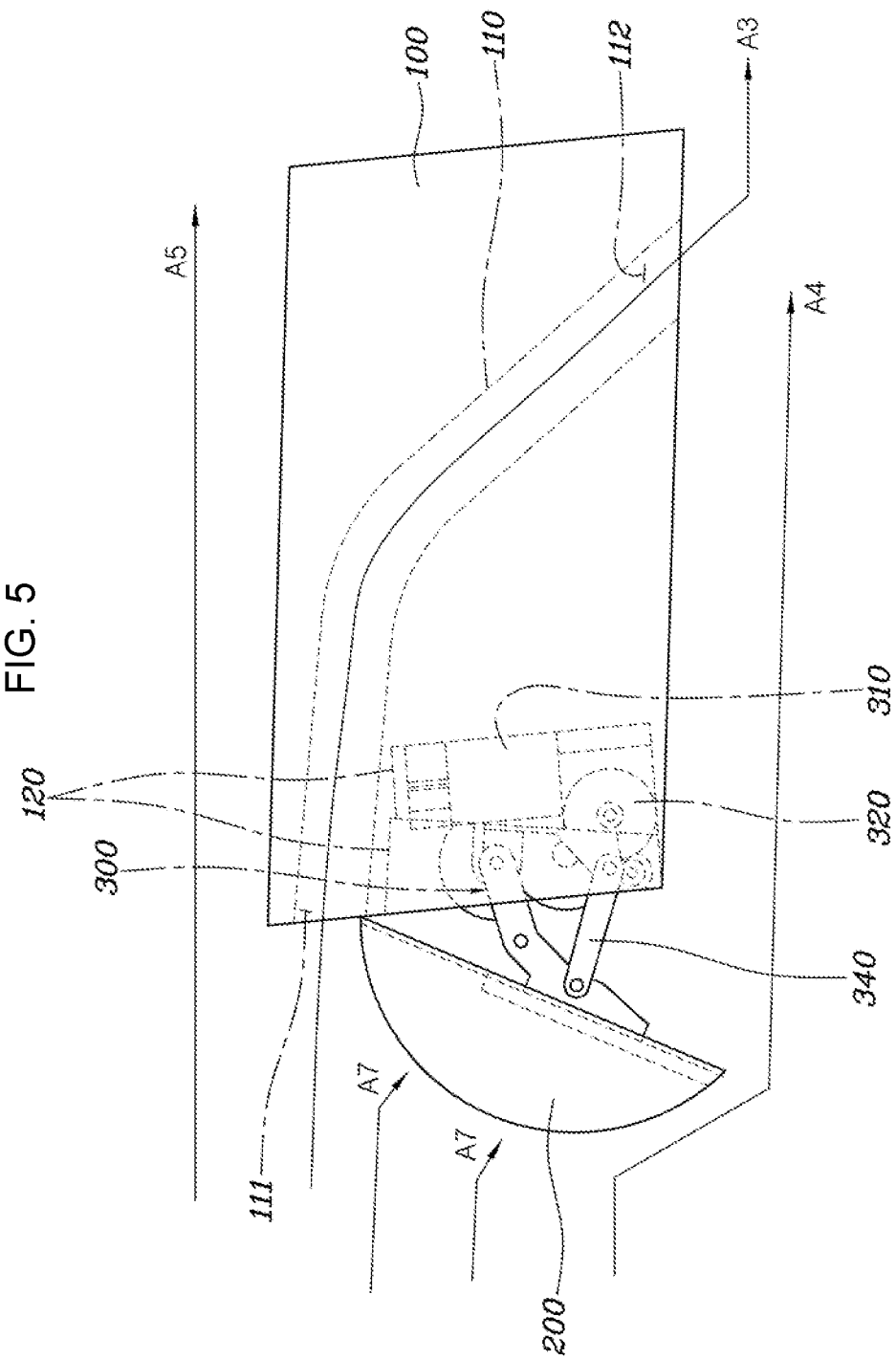
FIG. 5 is an enlarged view of the vehicle front active spoiler apparatus of FIG. 4.
Figure 6:
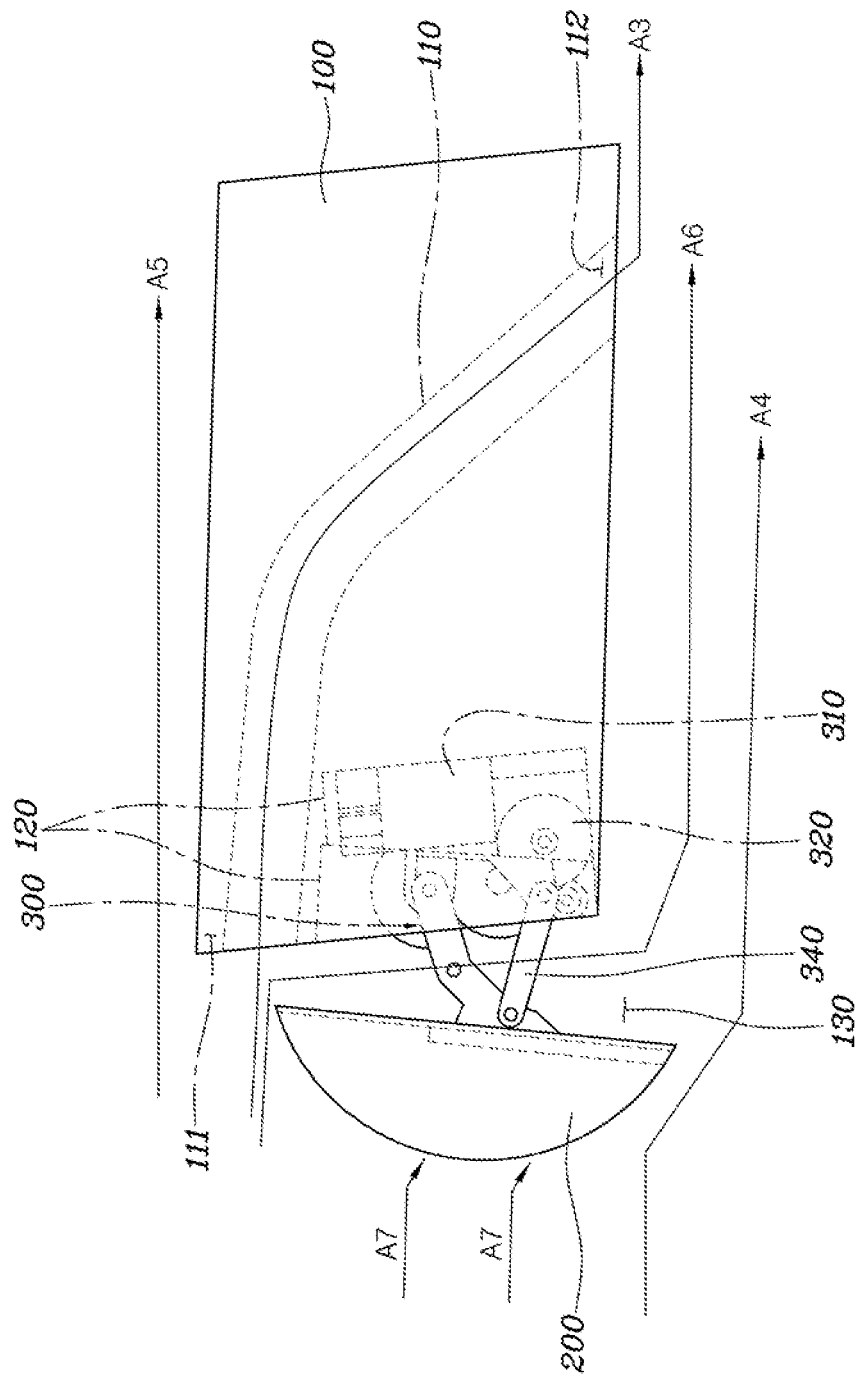
FIG. 6 is a view for explaining a secondary operation mode of the spoiler lip.

According to an exemplary embodiment of the present invention, while the vehicle is traveling at a high speed as illustrated in FIG. 1 and FIG. 2, the spoiler lip 200 operates to close the front inlet 111 of the duct 110 to reduce lift, and while the vehicle is traveling at a middle speed as illustrated in FIG. 4, FIG. 5 and FIG. 6, the spoiler lip 200 operates to open the front inlet 111 of the duct 110 to reduce both of drag and lift.

Furthermore, the operation of opening the front inlet 111 of the duct 110 by the spoiler lip 200 includes a primary operation mode and a secondary operation mode. As illustrated in FIG. 4 and FIG. 5, the primary mode is a mode in which the upper end portion of the spoiler lip 200 comes into contact with the front surface 101 of the spoiler housing 100 at a lower side of the front inlet 111 of the duct 110 and the lower end portion of the spoiler lip 200 is spaced from the front surface 101 of the spoiler housing 100 to protrude more forward than the upper end.

Furthermore, as illustrated in FIG. 6, the secondary operation mode is an operation mode in which the upper and lower end portions of the spoiler ribs 200 are both spaced from the front surface 101 of the spoiler housing 100. At the instant time, air passes through the space 130 between the spoiler lip 200 and the front surface 101 of the spoiler housing 100, and the air, which has passed through the duct 110 and the front surface 101 of the spoiler housing 100, merge together to pass through the lower side of the underbody 30. This makes it possible to further improve the drag reduction performance of the vehicle.

The controller 400 receives vehicle speed information through a vehicle speed sensor 500 and controls the operation of the actuator 300 using the vehicle speed information. Through this, the spoiler apparatus according to an exemplary embodiment of the present invention is configured for having an active function of actively operating in conjunction with the vehicle speed.

Hereinafter, the operation of the exemplary embodiment of the present invention will be described.

FIG. 1 and FIG. 2 illustrate a high-speed travel state in which the lift higher than the drag is applied. Thus, more efforts are required to reduce the lift for driving stability.

When the vehicle is in the high-speed travel state (when the vehicle speed is 100 Km/h or more, preferably 140 Km/h or more), the rear end portion of the spoiler lip 200 comes into close contact with the front surface of the spoiler housing 100 by the operation of the actuator 300 under the control of the controller 400, whereby the front inlet 111 of the duct 110 is closed by the spoiler lip 200.

When the front inlet 111 of the duct 110 is closed by the spoiler lip 200 as described above, the air does not move through the duct 110 but instead, the air amount moving to the upper side of the spoiler housing is increased (arrow A1). In contrast, the air amount passing through the underbody 30 through the underside of the spoiler housing 100 is decreased (arrow A2), reducing the lift generated during the high-speed travel and further improving the aerodynamic performance of the vehicle.

FIG. 4 and FIG. 5 illustrates that, in the medium-speed travel state, the drag greater than the lift is applied, and thus, more efforts are required to reduce the drag to improve the fuel efficiency.

When the vehicle is in the medium-speed travel state (when the vehicle speed is 50 Km/h or more, preferably 60 Km/h or more), the spoiler lip 200 moves forwards by the operation of the actuator 300 under the control of the controller 400, whereby the front inlet 111 of the duct 110 of the housing 100 is in the opened state in which the front inlet 111 and the rear outlet 112 are connected to each other.

FIG. 4 and FIG. 5 illustrate a state in which the spoiler lip 200 is in a primary operation mode for opening the front inlet 111 of the duct 110. At the instant time, the upper end portion of the spoiler lip 200 comes into contact with the front surface 101 of the spoiler housing 100 below the front inlet 111 of the duct 110 and the lower end portion of the spoiler lip 200 is spaced from the front surface 101 of the spoiler housing 100 and is tilted to protrude more forward than the upper end portion of the spoiler housing 100.

In the primary operation mode state as described above, as the duct 110 is opened, air moves along the duct 110 (arrow A3), and the air (arrow A3), which has moved along the duct 110, and air, which passes through the lower side of the spoiler housing 100 (arrow A4), merge together to pass through the underbody 30 in the lower portion of the spoiler housing 100. Thus, the air amount passing through the underbody 30 in the lower portion of the vehicle body is increased and instead, the air amount moving to the upper side of the spoiler housing 100 is decreased (arrow A5). As a result, it is possible to greatly reduce the drag force during the medium-speed travel and further to improve the aerodynamic performance of the vehicle.

When the amount of the air passing through the underbody 30 increases as the air A3, which has passed through the duct 110, and the air A4, which has passed through the lower portion of the spoiler housing 100, merge together, stagnant air, which is stagnant under the underbody 30 and acts as resistance, may be pushed out to the outside of the underbody 30 to be discharged, greatly reducing the drag and hence improving the aerodynamic performance of the vehicle.

Furthermore, as the spoiler lip 20 opens the duct 110, when the air moves through the duct 110, the air amount flowing into the engine compartment through the radiator 12 may be relatively reduced. Thus, it is possible to minimize the air flow loss in the engine compartment, improving the fuel efficiency of the vehicle.

FIG. 6 illustrates the state in which the spoiler lip 200 is in the secondary operation mode for opening the front inlet 111 of the duct 110. At the instant time, both the upper and lower end portions of the spoiler lip 200 remain in the state of being spaced from the front surface 101 of the spoiler housing 100.

In the state of the secondary operation mode, air passes through the space 130 between the spoiler lip 200 and the front surface 101 of the spoiler housing 100 (arrow A6), the air (A6), which has passed through the space 130, and both of air (A3), which has passed through the duct 110 and the air (A4), which passes through the lower side of the spoiler housing 100, merge together to pass through the underbody 30. Through this, the air amount passing through the underbody 30 of the vehicle further increases, making it possible to further reduce the drag of the vehicle.

Furthermore, when the spoiler lip 200 implements the primary operation mode and the secondary operation mode for opening the duct 110, a portion of the air (A7) acts as a pressure compressing the spoiler lip 200 while colliding with the front surface of the spoiler lip 200. Due to the provided configuration, the duct 110 is opened during medium-speed traveling, so that the lift can also be reduced when the drag force is reduced.

As described above, the exemplary embodiment of the present invention provide a configuration in which the front spoiler apparatus is configured for reducing drag and lift while actively operating in conjunction with the vehicle speed, in particular, a configuration in which the speed reduction gear 320 and the link mechanism 340 are used to increase the operating torque of the spoiler. Through this, the size of the motor 310 is reduced, weight reduction, cost reduction, and a compact configuration may be achieved.

Furthermore, the present invention can further improve the drag reduction effect by arranging the front inlet 111 of a duct 110 provided as an air passageway to be oriented toward the front of the vehicle and the rear outlet 112 of the duct 110 to be oriented toward the underbody 30 side in the lower portion of the vehicle.

Furthermore, various aspects of the present invention provide a configuration which is configured for implementing the lift reduction effect using the pressure of the air that hits the spoiler lip 200 during the operation at the drag force reduction mode. Through this, it is possible to further improve the aerodynamic performance improvement effect of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A spoiler apparatus for a vehicle, the spoiler apparatus comprising:
    a spoiler housing fixed to a front end module and having a duct fixedly positioned forwards from the front end module to guide air flowing in the spoiler housing;
    a spoiler lip mounted in a front of the spoiler housing and selectively opening the duct;
    an actuator connected to the spoiler lip to selectively operate the spoiler lip; and
    a controller connected to the actuator and configured to control the actuator using speed information of the vehicle,
    wherein the duct extends along a predetermined flow path in a forward and backward direction of the vehicle inside the spoiler housing, and wherein the duct includes:
        an inlet formed on a front side of the spoiler housing, the inlet which opens to a front surface of the spoiler housing; and
        an outlet formed on a rear side of the spoiler housing, the outlet which opens to a rear lower side of the spoiler housing,
    wherein a flow passage is formed between the inlet and the outlet, and
    wherein the inlet of the duct is selectively open or closed by the spoiler lip through the actuator to selectively guide the air flowing in the duct.

2. The spoiler apparatus of claim 1, wherein the spoiler lip is spaced from a front surface of the spoiler housing in a predetermined distance and pivotally mounted to the spoiler housing to form a space between the spoiler lip and the front surface of the spoiler housing for selectively guiding a flow direction of a portion of the air through the space.

3. The spoiler apparatus of claim 2, wherein the space between the spoiler lip and the front surface of the spoiler housing is selectively closed by the actuator according to a signal of the controller related to the speed information of the vehicle.

4. The spoiler apparatus of claim 3,
    wherein the controller controls the spoiler lip to close the duct when the vehicle is in a first speed travel state, and
    wherein the controller controls the spoiler lip to open the duct when the vehicle is in a second speed travel state in which the vehicle travels slower than in the first speed travel state.

5. The spoiler apparatus of claim 3,
    wherein the spoiler lip is operated to open the duct under a first operation mode or a second operation mode,
    wherein the first operation mode is an operation mode in which the space formed between the spoiler lip and the front surface of the spoiler housing is closed, and wherein the second operation mode is an operation mode in which the space formed between the spoiler lip and the front surface of the spoiler housing is opened.

6. The spoiler apparatus of claim 1, wherein the spoiler housing is fixed to the front end module to be located between a lower grill of a front bumper and a radiator assembly.

7. The spoiler apparatus of claim 1, wherein the outlet of the duct is provided to face an underbody in a lower portion of the vehicle, and air, which has passed through the outlet, passes through a lower side of the underbody.

8. The spoiler apparatus of claim 1,
wherein the spoiler lip operates to close the inlet of the duct while being in contact with the front surface of the spoiler housing, and
wherein the spoiler lip operates to open the inlet of the duct while being spaced from the front surface of the spoiler housing.

9. The spoiler apparatus of claim 1, wherein the spoiler lip has a front surface in a semi-circular shape with an intermediate portion of the spoiler lip protruding more forward than upper and lower end portions of the spoiler lip.

10. The spoiler apparatus of claim 1, wherein the actuator includes:
a motor fixed to the spoiler housing;
a speed reduction gear connected to the motor,
a rotation shaft coupled to the speed reduction gear to rotate with the speed reduction gear; and
a link mechanism coupled to first and second end portions of the rotation shaft and connected to the spoiler lip.

11. The spoiler apparatus of claim 10,
wherein the spoiler housing has an actuator mounting recess formed on a front surface of the spoiler housing,
wherein the actuator is mounted in the actuator mounting recess, and
wherein the inlet of the duct is disposed above the actuator mounting recess.

12. The spoiler apparatus of claim 1,
wherein the controller controls the spoiler lip to close the inlet of the duct to reduce lift of the vehicle when the vehicle is in a first speed travel state, and
wherein the controller controls the spoiler lip to open the inlet of the duct to reduce drag and the lift of the vehicle when the vehicle is in a second speed travel state in which the vehicle travels slower than in the first speed travel state.

13. The spoiler apparatus of claim 1,
wherein operation of the spoiler lip to open the inlet of the duct includes a first operation mode and a second operation mode,
wherein the first operation mode is an operation mode in which an upper end portion of the spoiler lip comes in contact with the front surface of the spoiler housing at a lower side of the inlet of the duct and a lower end portion of the spoil lip is spaced from the front surface of the spoiler housing to more protrude forwards than the upper end portion, and
wherein the secondary operation mode is an operation mode in which the upper end portion and a lower end portion of the spoiler lip are spaced from the front surface of the spoiler housing to form a space between the spoiler lip and the front surface of the spoiler housing.

14. The spoiler apparatus of claim 13, wherein in the second mode of operation, air passes through the space between the spoiler lip and the front surface of the spoiler housing and the air, which has passed through the space between the spoiler lip and the front surface of the spoiler housing, and air, which has passed through the duct, merge together to pass through a lower side of the underbody together.

* * * * *